United States Patent [19]

Hager

[11] Patent Number: 4,723,992

[45] Date of Patent: Feb. 9, 1988

[54] FIXATION OF ARSENIC IN SOIL

[76] Inventor: Bror O. Hager, Forsetevagen 5, S-182 63 Djursholm, Sweden

[21] Appl. No.: 701,971

[22] Filed: Feb. 15, 1985

[30] Foreign Application Priority Data

Feb. 17, 1984 [SE] Sweden ................................ 8400880

[51] Int. Cl.⁴ .......................... A01N 55/02; C07F 9/68
[52] U.S. Cl. ........................................ 71/97; 556/61; 556/149; 556/183
[58] Field of Search ........................ 556/61, 149, 183; 71/97

[56] References Cited

U.S. PATENT DOCUMENTS

| | | | |
|---|---|---|---|
| 801,158 | 10/1905 | Reiss | 556/183 |
| 1,030,747 | 6/1912 | Quade | 556/183 |
| 1,054,735 | 3/1913 | Wolff | 556/149 |
| 2,650,239 | 8/1953 | Stover | 556/61 |
| 3,317,574 | 5/1967 | Morita et al. | 556/149 |
| 3,576,762 | 4/1971 | Maquet-Martin et al. | 556/149 |
| 3,957,598 | 5/1976 | Morse | 556/149 |
| 3,983,214 | 9/1976 | Misato et al. | 424/180 |
| 4,404,146 | 9/1983 | Lionelle et al. | 556/149 |

Primary Examiner—Helen M. S. Sneed
Attorney, Agent, or Firm—Burns, Doane, Swecker & Mathis

[57] ABSTRACT

The present invention represents compositions for the fixing of pentavalent arsenic, e.g., arsenates and arsenic acid, generally spread in the soil. The fixation is so carried out that the arsenic cannot be further spread, not even after an eventual further increase in soil acidity. The compositions comprise metal salts of iron, aluminum or chromium with a weak acid, preferably iron or aluminum acetate, which are spread on the soil containing the arsenic compounds.

18 Claims, No Drawings

FIXATION OF ARSENIC IN SOIL

BACKGROUND OF THE INVENTION

Environmental pollution has occurred in the vicinity of certain plants for wood preservation with water solutions of preservatives containing metal salts through spillage of such solutions from apparatus and wood, with the result that the underlying soil has been contaminated. Some of these preservatives are based on compounds of copper, chromium and pentavalent arsenic. The two first substances are commonly fixed in the soil to such a degree that as a rule they have not been considered dangerous. However, the arsenic acid has not been fixed to the same degree, and furthermore it is not so resistant against acidity as copper and chromium, i.e., is more easily dissolved. The question has been raised whether further increased soil acidity could cause movement of the arsenic acid and a spreading to more sensitive regions.

The investigations carried out up to now do not indicate future problems. However, an increased acidity cannot be excluded—sometimes such a situation is considered plausible—and how far this will proceed in such a case and what consequences it will have cannot be foreseen.

Furthermore, popular concern over such potential hazards can influence public opinion and cause irritation. It is thus of importance to find a way to solve the problems. If a relatively high content of arsenic acid is present in a small amount of soil, a carrying away of the contaminated soil may be recommended. Even a leaching of the soil with strong acid can technically be carried out. The present invention does not cover these two possibilities which are of less interest.

SUMMARY OF THE INVENTION

An object of this invention is to fix the arsenic acid so permanently that it is not considered environmentally dangerous, that is so fixed in situ that it cannot be dissolved or migrate to more sensitive regions. Another object of the invention is the fixation of the arsenic so effectively as to withstand every possible increase in acidity of the soil, present or future. Excessive acidity may otherwise cause an increased solubility, forming soluble mobile acid arsenates or arsenic acid. Still another object of the invention is a method for fixing such arsenic acid permanently in the form of inorganic compounds, which in contrast to organic substances have higher resistance in all respects, e.g., against decomposition. For example, iron, aluminum and chromium arsenates are among the least soluble and also the most resistant against the influence of acidity.

The problem is how the precipitation of the arsenic acid has to be fulfilled. If a salt of a strong acid is used, for instance the sulphates of iron, aluminum or chromium, no precipitation is obtained with arsenic acid. If the arsenic is present as acid arsenates or if the soil provides a buffering influence a certain amount of precipitation (fixation) can occur but the sulphuric acid will acidify the soil in an undesirable way.

A certain reduction of the acidity is obtained if ferrous sulphate is used and the circumstances are such that an oxidation of the iron takes place so that a precipitation of ferric arsenate is obtained. In this case we thus have the situation that only two equivalents of sulphuric acid are needed for dissolution of one mole of the bivalent iron, whereafter three equivalents of iron are delivered for the precipitation of the arsenic acid. This will result in a reduced acidity. These reactions are, however, difficult to keep under control. The possibility of utilizing valence changes also exists when chromium compounds are used. Bivalent chromium compounds are, however, difficult to prepare and they are not so resistant to acids (durable). Another way is to use hexavalent compounds, such as chromic acid and chromates, but this presupposes that reducing substances are present in situ where the chromates contact the arsenic acid. Valence changes may be possible to utilize in connection with aluminum if aluminates are used. However, due to the acidity and the buffering properties of the soil, aluminum often will precipitate too early as the hydroxide.

In accordance with the invention, it has been discovered that the precipitation of the arsenic acid can be fulfilled effectively if soluble salts of some weak acids are used under suitable conditions. Several such salts are usable. Such salts should be easy to produce and harmless to the environment. The salts of weak organic acids have been found suitable with the carboxylic acids being preferred. The acetates have proved to be the most suitable, along with formate and propionate.

DETAILED DESCRIPTION OF THE INVENTION

The acetates of bivalent iron, aluminum and trivalent chromium are easy to dissolve, and the resulting solution has a pH below 7. With iron and aluminum acetate arsenic acid can be effectively precipitated. With chromium acetate the same good precipitation is not obtained, unless after some pH increase which possibly can be obtained by influence from the soil. The chromium compound thus seems generally not to be as suitable as the two others, nor does it give an arsenate with the same low solubility at lower pH values.

If a ferrous acetate solution with pH around 6.5 is mixed with an arsenic acid solution, the arsenic is precipitated as ferrous arsenate. This is sparsely soluble in acid media; to dissolve the precipitate, sulphuric acid has to be added until the pH reaches about 1. An effective and pH resistant precipitate is thus obtained.

If the ferrous compound is oxidized to a ferric compound after the contact with the arsenic acid it can be said that a 50 percent equivalent increase of the iron is obtained. The ferric arsenate thus formed has at least the same good acid resistance as ferrous arsenate.

If the precipitation is carried out with an aluminum acetate solution with a pH of 4.5, a precipitate of aluminum arsenate is obtained. To dissolve this precipitate, sulphuric acid has to be added until a pH of about 2 is produced. Even here the resistance against dissolution in acid media is very great.

Suitable treatment mixtures containing aluminum and chromium can be prepared of acetates in solid form or of solid salt mixtures which form acetates or water solutions thereof. They are stable, and easy to prepare and handle. The mixture of an aluminum and/or chromium salt of a strong acid and an alkaline metal or ammonium acetate may be used. However, the situation for the ferrous compounds is a little different. They are less stable. Increased stability is obtained if they are present in solution, for example in the form of a mixture of ferrous sulfate and an alkali metal acetate. The solution preferably is free from oxygen. A reducing substance such as a sulphite or nitrite increases the stability.

Trials indicate that the most suitable acetate is presently the ammonium acetate, since it seems to give not only more stable solutions (compared to Mohr's salt) but also a more complete precipitation of the arsenic acid.

These acetates can for distribution be prepared in solid form or in the form of solutions containing more than about 10 percent acetates.

Stable iron mixtures can be made up from ferric compounds. A good method of preparation is to mix ferric sulphate, ferric chloride or ferric nitrate with an alkali metal acetate in solid or in dissolved form. The solutions generally have a pH value of around 3 to 4. They give a very effective precipitation of the arsenic acid. To dissolve precipitated ferric arsenate, the pH value must be decreased to under about 1 by addition of acid.

Strong concentrates of ferric acetate can be prepared for convenience in distribution. Different acetates can of course be used in admixture.

In order to control the properties of the metal (iron, aluminum, chromium) acetate mixtures the amount of alkali metal (sodium, potassium) or ammonium acetates can be varied. By increasing the amount of the alkali metal acetates to for example about 10 to 25 weight percent an increased stability of the mixture or solution can be obtained. By selecting different alkali metal acetates the pH value of the solutions can also be regulated to some degree.

To prevent premature precipitation of metal hydroxides due to the pH influence of the soil, a minor surplus of acetic acid can be used. Stronger acid as sulphuric acid may also be used but can cause undesirable soil acidity if used in excess. Addition of acid to the soil treating mixture may also be advisable if the arsenic acid is present in a less soluble form in the soil. A lesser amount of acid can also be used in solutions of ferrous acetate in order to obtain increased stability. Oxidized iron in these cases does not precipitate as the hydroxide, instead it is dissolved by the free acid. The amounts of equivalents of free acid may be about 10 to 25 percent of the amount of equivalent metal acetate present.

The invention will be better understood with the aid of the following chemical equations:

If ferrous acetate is used, the following reaction is obtained with arsenic acid:

$$3FeAc_2 + 2H_3AsO_4 \rightarrow Fe_3(AsO_4)_2 + 6HAc,$$

wherein one Fe atom fixes ⅔ As atom. If an oxidation of the iron occurs in connection with the precipitation, the following reaction takes place:

$$2FeAc_2 + 2H_3AsO_4 + O \rightarrow 2FeAsO_4 + 4HAc + H_2O,$$

wherein each Fe atom fixes one As atom.

If trivalent iron, aluminum or chromium are used for the precipitation the following reaction occurs:

$$FeAc_3 + H_3AsO_4 = FeAsO_4 + 3HAc,$$

In the above formula Fe is representative, and can be replaced by Al or Cr.

Examples of suitable soil treating mixtures (in molar proportions) are:
1. $FeSO_4 + 2NH_4Ac$
2. $FeCl_3 + 3NaAc$ or $3NH_4Ac$
3. $Fe_2(SO_4)_3 + 6NH_4Ac$ or $6NaAc$
4. $Al_2(SO_4)_3 + 6NH_4Ac$ or $6NaAc$ To mixture 1, for instance, may be added 0.1 mol $(NH_4)_2SO_3$ and/or 02. mol $NH_4Ac$ and/or 0.2 mol HAc or 0.1 mol $H_2SO_4$. To the mixtures 2-4, for instance, may be added 0.2 mol $NH_4Ac$ or 0.2 mol NaAc and/or 0.2 mol HAc.

The amounts of arsenic acid that can be fixed by the acetates are given by the above written formulas. For example, one mol bivalent Fe (56 grams) fixes 2/3 mol $H_3AsO_4$ (95 grams $H_3AsO_4$ or 50 grams As), and one mol trivalent Fe, Al or Cr fixes one mol $H_3AsO_4$ (142 grams $H_3AsO_4$ or 75 grams As).

The fixation of the arsenic in the soil is preferably carried out by spreading a solution of metal acetate upon the soil. The strength of the solution may generally be varied between 1 and 10 percent. The lower concentrations are generally preferred, as the acetates are better distributed in this manner. To spread the acetates on the soil in solid form gives less distribution, at least initially; however, rain and moist soil facilitate the distribution of the acetates in the soil.

The arsenic acid can be present in the form of an acid, or eventually a neutral, arsenate with a lower solubility. The reaction with the acetate takes a longer time in these cases. In order to obtain better distribution and safer precipitation of the arsenic acid it is advantageous to use repeated treatments, especially when low solubility arsenates are present. This is also helpful in the cases when the arsenic acid is unevenly spread or the presence of the arsenic is uncompletely known.

For these reasons the metal acetate is preferably added to the soil in at least double the amount required to fix the corresponding arsenic acid which is known or expected to be present.

EXAMPLES

The present invention is illustrated further by the following non-limiting examples.

EXAMPLE I

Trials of compositions in accordance with the invention were conducted on a number of fields in Sweden which were contaminated with arsenic from plants for the impregnation of wood with arsenic-containing chemicals to investigate the ability of iron and aluminum compounds to fix the arsenic in the soil. The trials were conducted by the Department of Soil Instruction, Institute for Soil Technology, of Sweden's Agricultural University.

The first five fields tested were selected to represent different soil types as to their amounts of clay and humus and pH, but containing about the same amounts of total dissolvable arsenic. Four additional fields were tested, of which the first three had been treated directly with the arsenic-containing impregnation product Boliden K33.

The fourth, Tranemo 3, was located directly at the output ramp of the impregnation plant, thus had received spillage or dripping from the impregnated products. The fields tested and their characteristics are shown in Table I.

TABLE I

Investigated fields, soil characteristics and total dissolvable arsenic content

| Field from which soil sampled | level cm | Clay Vol. % | Humus Vol. % | pH (CaCl$_2$) | Arsenic mg/kg |
|---|---|---|---|---|---|
| Backa 2 | 0–10 | 5 | 1.7 | 7.3 | 1.070 |
| Strömsholm 1 | 15–30 | 50 | 15.4 | 5.4 | 1.310 |
| Strömsholm 2 | 0–15 | 32 | 14.2 | 6.0 | .820 |

TABLE I-continued

Investigated fields, soil characteristics and total dissolvable arsenic content

| Field from which soil sampled | level cm | Clay Vol. % | Humus Vol. % | pH (CaCl$_2$) | Arsenic mg/kg |
|---|---|---|---|---|---|
| Asbro 2 | 0–8 | 18 | 23.1 | 5.0 | 1.220 |
| Hjältevad 3 | 0–10 | 5 | 1.8 | 7.3 | .840 |
| Ler | 0–20 | 55 | 3.2 | 6.8 | 1.380 |
| Kärrtorv | 0–20 | 70 | 50.4 | 4.6 | 4.250 |
| Sand | 0–20 | 3 | 3 | 4.4 | 1.115 |
| Tranemo 3 | 0–5 | 3 | 1.8 | 4.1 | 9.530 | analysis for arsenic content. Control samples were processed in a similar manner, using extraction with NH$_4$Ac without the fixation salts of the invention, and extraction with water following that. The liquids extracted were tested for pH after treatment with the iron and aluminum salts, and also after water extraction.

The results of the fixation process are shown in Table II as the amount of arsenic in the water extract after treatment in relation to the amount in the water extract without treatment with fixation salts (i.e., with NH$_4$Ac only), expressed as arsenic in dry soil, mg/kg or ppm.

TABLE 2

| Sample | Treatment | pH$_O$ Hours 1 | 8 | 24 | pH$_{H2O}$ Hours 1 | 8 | 24 | Arsenic, mg/kg Hours 1 | 8 | 24 |
|---|---|---|---|---|---|---|---|---|---|---|
| Backa 2 | NH$_4$Ac | 5.9 | 6.9 | 6.1 | 7.1 | 6.9 | 6.9 | 11.40 | 0.70 | 10.10 |
| | FeSO$_4$ | 5.5 | 5.5 | 5.6 | 6.7 | 6.4 | 6.4 | 0.23 | 0.06 | 0.04 |
| | FeCl$_3$ | 5.5 | 5.5 | 5.6 | 6.7 | 6.6 | 6.1 | 0.24 | 0.26 | 0.17 |
| | Fe$_2$(SO$_4$)$_3$ | 5.4 | 5.4 | 5.5 | 6.5 | 6.3 | 5.4 | 0.35 | 0.11 | 0.11 |
| | Al$_2$(SO$_4$)$_3$ | 5.5 | 5.5 | 5.6 | 6.7 | 6.3 | 6.3 | 3.70 | 1.70 | 1.20 |
| Strömsholm 1 | NH$_4$Ac | 5.7 | 5.7 | 5.7 | 5.9 | 6.0 | 5.9 | 31.00 | 27.80 | 27.50 |
| | FeSO$_4$ | 5.4 | 5.4 | 5.4 | 5.5 | 5.5 | 5.4 | 6.70 | 4.43 | 3.61 |
| | FeCl$_3$ | 5.3 | 5.3 | 5.4 | 5.6 | 5.5 | 5.5 | 6.76 | 6.54 | 3.76 |
| | Fe$_2$(SO$_4$)$_3$ | 5.3 | 5.3 | 5.3 | 5.5 | 5.5 | 5.5 | 7.36 | 6.95 | 7.11 |
| | Al$_2$(SO$_4$)$_3$ | 5.4 | 5.5 | 5.4 | 5.5 | 5.5 | 5.5 | 16.00 | 12.40 | 12.40 |
| Strömsholm 2 | NH$_4$Ac | 5.8 | 5.9 | 6.3 | 6.2 | 6.1 | 6.1 | 22.70 | 16.20 | 15.20 |
| | FeSO$_4$ | 5.5 | 5.5 | 5.5 | 5.8 | 5.7 | 5.6 | 3.24 | 2.21 | 1.90 |
| | FeCl$_3$ | 5.5 | 5.5 | 5.5 | 5.7 | 5.7 | 5.6 | 9.27 | 6.18 | 6.33 |
| | Fe$_2$(SO$_4$)$_3$ | 5.4 | 5.4 | 5.4 | 5.6 | 5.6 | 5.6 | 4.12 | 3.91 | 4.53 |
| | Al$_2$(SO$_4$)$_3$ | 5.5 | 5.5 | 5.5 | 5.7 | 5.7 | 5.7 | 7.21 | 5.67 | 5.97 |
| Asbro | NH$_4$Ac | 5.7 | 5.7 | 5.6 | 5.9 | 6.0 | 5.9 | 13.50 | 11.30 | 14.40 |
| | FeSO$_4$ | 5.4 | 5.4 | 5.4 | 5.5 | 5.5 | 5.4 | 2.69 | 1.55 | 1.85 |
| | FeCl$_3$ | 5.3 | 5.3 | 5.4 | 5.5 | 5.5 | 5.2 | 6.00 | 2.37 | 2.78 |
| | Fe$_2$(SO$_4$)$_3$ | 5.3 | 5.3 | 5.3 | 5.5 | 5.5 | 5.5 | 3.50 | 3.30 | 3.50 |
| | Al$_2$(SO$_4$)$_3$ | 5.4 | 5.4 | 5.4 | 5.5 | 5.5 | 5.5 | 6.43 | 4.38 | 4.33 |
| Hjältevad 3 | NH$_4$AC | 6.1 | 6.4 | 6.4 | 7.5 | 7.0 | 7.0 | 36.40 | 37.40 | 46.50 |
| | FeSO$_4$ | 5.5 | 5.5 | 5.6 | 6.7 | 6.4 | 6.4 | 0.36 | 0.10 | 0.07 |
| | FeCl$_3$ | 5.6 | 5.7 | 5.8 | 6.9 | 5.9 | 5.9 | 0.32 | 0.40 | 0.18 |
| | Fe$_2$(SO$_4$)$_3$ | 5.6 | 5.6 | 5.6 | 7.0 | 5.8 | 5.8 | 0.68 | 0.14 | 0.14 |
| | Al$_2$(SO$_4$)$_3$ | 5.7 | 5.7 | 5.8 | 7.1 | 5.8 | 5.8 | 11.60 | 3.23 | 2.02 |
| | | | | | | | | | | ppm |
| Ler | NH$_4$Ac | | 5.9 | | | 6.5 | | | | 206.00 |
| | FeSO$_4$ | | 5.9 | | | 6.3 | | | | 23.30 |
| | FeCl$_3$ | | 5.8 | | | 6.2 | | | | 85.70 |
| | Fe$_2$(SO$_4$)$_3$ | | 5.8 | | | 6.2 | | | | 95.00 |
| | Al$_2$(SO$_4$)$_3$ | | 5.8 | | | 6.2 | | | | 113.00 |
| Kärrtorv | NH$_4$Ac | | 5.3 | | | 5.6 | | | | 197.00 |
| | FeSO$_4$ | | 5.3 | | | 5.5 | | | | 18.60 |
| | FeCl$_3$ | | 5.2 | | | 5.4 | | | | 65.70 |
| | Fe$_2$(SO$_4$)$_3$ | | 5.2 | | | 5.4 | | | | 58.2 |
| | Al$_2$(SO$_4$)$_3$ | | 5.3 | | | 5.5 | | | | 86.6 |
| Sand | NH$_4$Ac | | 5.7 | | | 6.1 | | | | 85.50 |
| | FeSO$_4$ | | 5.7 | | | 5.7 | | | | 0.80 |
| | FeCl$_3$ | | 5.6 | | | 5.7 | | | | 6.74 |
| | Fe$_2$(SO$_4$)$_3$ | | 5.6 | | | 5.7 | | | | 8.85 |
| | Al$_2$(SO$_4$)$_3$ | | 5.6 | | | 5.7 | | | | 6.54 |
| Tranemo 3 | NH$_4$Ac | 5.7 | 5.8 | 5.6 | 6.1 | 6.2 | 6.4 | 218.00 | 184.00 | 210.00 |
| | FeSO$_4$ | 5.2 | 5.1 | 5.1 | 4.9 | 4.9 | 4.9 | 0.04 | 0.02 | 0.02 |
| | FeCl$_3$ | 4.6 | 4.7 | 4.7 | 4.7 | 4.9 | 4.9 | 10.20 | 34.30 | 2.03 |
| | Fe$_2$(SO$_4$)$_3$ | 4.8 | 4.8 | 4.8 | 5.0 | 5.0 | 4.8 | 28.80 | 7.07 | 0.04 |
| | Al$_2$(SO$_4$)$_3$ | 4.9 | 4.9 | 4.9 | 4.9 | 5.0 | 4.9 | 27.30 | 2.47 | 1.19 |

Trials were carried out on the fields impregnated with arsenic-containing substances (the first five fields listed, plus Tranemo 3) using a solution 2.5 equimolar relative to the amount of total dissolvable arsenic, containing iron or aluminum, using ferrous sulfate, ferric chloride, ferric sulfate, aluminum sulfate or 0.2M NH$_4$Ac (control). Treating periods were 1, 8 and 24 hours. After treatment, the samples were centrifuged for five minutes at 10,000 rpm, after which the solution was removed. After removal of the solution, the samples were extracted with water for 24 hours, and centrifuged for five minutes at 10,000 rpm. The solution samples removed were placed in plastic bottles for later The treatment solutions were buffered with a 0.2M ammonia-acid solution, but these solutions were not completely able to buffer the various pH values encountered in the fields treated. In the fields with high pH, the solution's pH increased, and in acid fields the solution's pH decreased. However, the pH of the solutions did not change with the length of the treatment time, except for the controls. Adding salt decreased the pH of the solutions, compared to the controls.

The pH of the water extracted was generally between the pH of the treatment solutions and the soil's natural pH. This value changed with the length of the treatment time in several cases.

The amount of extractable arsenic in the untreated fields varies in the first five fields sampled between 9.7 and 46.5 mg/kg of soil. In the four other fields, the amount of extractable arsenic varied between 86 and 218 ppm. These variations in amount are mainly dependent upon the fields' respective amounts of total dissolvable arsenic. In the controls, water extracted about 2.0%, on the average, out of the total amount of arsenic. The individual values varied from 0.9 to 5.5%, with Åsbrojorden having the lowest and Hjältevadsjorden the highest value.

The three fields treated with Boliden K33 (Ler, Kärrtorv, and Sand), gave from 4.6 to 14.9% extraction of arsenic in water extraction before the controls. This high value may be due to the relatively short time that these fields were treated with the impregnation product, compared to the fields located at the impregnation plant, since the fixation of arsenic to the soil has probably not been completed. In the fields near the impregnation plant, on the other hand, the arsenic is probably partially dissolved from the mobile fraction.

The amounts of arsenic extracted have a tendency to decrease with increased treatment time in both the controls and the treatment links. This implies that there is a certain amount of re-fixation of arsenic into most of the fields.

In Table III the fixation percentages are compared, that is the amount of arsenic in the water extracted after treatment has been compared with the amount of arsenic in the water extracted from the samples without treatment.

clay and humus in the fields have great significance for the efficiency of the arsenic fixation process.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

I claim:

1. A method for fixing pentavalent arsenic derived from preservatives from wood preservation plants, comprising spreading onto a soil previously contaminated with arsenic metal salts of at least one of iron, aluminum and chromium with a weak organic acid.

2. A method according to claim 1, wherein said organic weak acid is a carboxylic acid.

3. A method according to claim 2, wherein said weak acid is selected from the group consisting of formic acid, acetic acid, propionic acid, and mixtures of the above.

4. A method according to claim 2, wherein said weak acid is acetic acid.

5. A method according to claim 1, wherein the metal is at least one of iron and aluminum.

6. A method according to claim 1, wherein the metal is iron.

7. A method according to claim 1, comprising ferrous acetate.

TABLE III

| | Arsenic Fixation in Treated Samples Compared to Controls, %, and Average Values for 24 hours Treatment | | | | | | | | | | |
|---|---|---|---|---|---|---|---|---|---|---|---|
| | $FeSO_4$ time (hours) | | | $FeCl_3$ time (hours) | | | $Fe_2(SO_4)_3$ time (hours) | | | $Al_2(SO_4)_3$ time (hours) | | | Averages - for 24 |
| SAMPLE | 1 | 8 | 24 | 1 | 8 | 24 | 1 | 8 | 24 | 1 | 8 | 24 | hours |
| Backa 2 | 98.0 | 99.4 | 99.6 | 97.9 | 97.9 | 98.4 | 96.9 | 98.9 | 99.0 | 67.5 | 82.5 | 88.7 | 96.4 |
| Strömsholm 1 | 78.4 | 84.1 | 86.9 | 78.2 | 76.9 | 86.4 | 76.3 | 75.0 | 74.2 | 48.5 | 55.6 | 55.1 | 75.7 |
| Strömsholm 2 | 85.7 | 86.3 | 87.5 | 59.1 | 61.8 | 58.5 | 81.8 | 75.8 | 70.3 | 68.2 | 65.0 | 60.5 | 69.2 |
| Asbro 2 | 80.2 | 86.4 | 87.1 | 51.6 | 78.1 | 80.6 | 74.1 | 69.5 | 75.7 | 52.3 | 59.5 | 70.0 | 78.4 |
| Hjältevad 3 | 99.0 | 99.6 | 99.9 | 99.1 | 98.3 | 99.6 | 98.1 | 99.4 | 99.7 | 68.1 | 86.1 | 95.7 | 98.7 |
| Tranemo 3 | 100.0 | 100.0 | 100.0 | 95.3 | 81.3 | 99.0 | 86.8 | 96.2 | 100.0 | 87.5 | 98.7 | 99.5 | 99.6 |
| Ler | | | 88.7 | | | 58.4 | | | 53.9 | | | 44.9 | 61.5 |
| Kärrtorv | | | 90.6 | | | 66.8 | | | 70.6 | | | 56.2 | 71.1 |
| Sand | | | 99.0 | | | 92.1 | | | 89.6 | | | 92.4 | 93.3 |
| Averages for 24 hours | | | 93.3 | | | 82.2 | | | 81.4 | | | 73.7 | |

The results of these trials indicate the fixation of the arsenic is most efficient with ferrous sulfate, the salt with iron in valence (2). This was the case with both the six impregnated fields and the three fields treated with Boliden K33. Trivalent iron can be added as either the chloride or the sulfate without apparent effect regarding the degree of fixation. The ferric sulfate, however, seems in general to have some acidifying effect on the water extracted from the soil, compared to the chloride, as can be seen from Table II. Fixation with aluminum sulfate is less efficient—22 percent lower than with ferrous sulfate.

There was a noticeable variation in arsenic-fixing ability among the fields. In the sandy soils from Backa, Hjältevad and Tranemo, for instance, the fixation of arsenic is nearly complete, and the amount of water-soluble arsenic drops to a few tenths of a ppm. However, in clay fields and fields with high amounts of organic material, the fixation ability is lower. This refers mainly to the salts of trivalent iron and aluminum. The fields treated with Boliden K33 confirm that the amounts of 8. A method according to claim 1, comprising a mixture of ferrous sulfate and at least one acetate of sodium, potassium or ammonium.

9. A method according to claim 1, comprising a ferrous salt, and further comprising a reducing agent.

10. A method according to claim 1, further comprising an alkali metal or ammonium salt of a carboxylic acid, and/or free acid as a carboxylic acid or sulfuric acid.

11. A method according to claim 1, wherein said pentavalent arsenic is present at least partially as at least one of arsenic acid and arsenates.

12. A method according to claim 1, comprising a water solution of said metal salts.

13. A method according to claim 8, wherein said acetate is ammonium acetate.

14. A method according to claim 9, wherein said reducing agent is at least one of a sulfite or a nitrite.

15. A method according to claim 10, wherein said salt is an acetate and said acid is acetic acid.

16. A method for fixing pentavalent arsenic in soil derived from preservatives from wood preservation plants, comprising spreading onto the soil a mixture of an aluminum and/or chromium salt of a strong acid and an alkali metal or ammonium acetate.

17. A method for fixing pentavalent arsenic in soil derived from preservatives from wood preservation plants, comprising spreading onto the soil a water solution of a ferric salt of a strong acid and an alkali metal or ammonium salt of a carboxylic acid.

18. A method according to claim 17, wherein said ferric salt is a sulfate, a chloride, or a nitrate and said carboxylic acid is acetic acid.

* * * * *